United States Patent [19]
Kwon et al.

[11] Patent Number: 5,796,218
[45] Date of Patent: Aug. 18, 1998

[54] HIGH VOLTAGE STABILIZING CIRCUIT

[75] Inventors: Joong-Yeol Kwon; Hideki Kofune, both of Kyungki-do, Rep. of Korea

[73] Assignee: SamSung Electronics Co., Ltd., Kyungki-do, Rep. of Korea

[21] Appl. No.: 829,136

[22] Filed: Mar. 28, 1997

[30] Foreign Application Priority Data

Mar. 28, 1996 [KR] Rep. of Korea ............... 1996-8907

[51] Int. Cl.⁶ .................................................. H01J 29/70
[52] U.S. Cl. .................................................. 315/411
[58] Field of Search ........................... 315/411; 363/21

[56] References Cited

U.S. PATENT DOCUMENTS

| | | |
|---|---|---|
| 4,209,731 | 6/1980 | Miko et al. |
| 4,466,051 | 8/1984 | Fitzgerald |
| 4,524,411 | 6/1985 | Willis |
| 4,559,591 | 12/1985 | Grünsch |
| 4,728,868 | 3/1988 | Ishikawa et al. |
| 4,823,248 | 4/1989 | Ikeuchi et al. |
| 4,866,353 | 9/1989 | Haferl |
| 4,916,366 | 4/1990 | Wilber et al. |
| 4,968,106 | 11/1990 | Ikeuchi et al. |
| 5,089,947 | 2/1992 | Driscoll et al. |
| 5,189,599 | 2/1993 | Messman ............... 363/21 |
| 5,266,871 | 11/1993 | Haferl |
| 5,331,532 | 7/1994 | Iwai et al. |

*Primary Examiner*—Gregory C. Issing
*Attorney, Agent, or Firm*—Robert E. Bushnell, Esq.

[57] ABSTRACT

A high voltage stabilizing circuit includes: an error amplifier for receiving a flyback pulse rectified from one secondary side coil of a flyback transformer at an inverting terminal thereof and for receiving a reference voltage at a non-inverting terminal thereof, and for comparing the received inputs; a pulse width modulator for implementing a modulating operation in accordance with an output signal of the error amplifier and for simultaneously generating an output signal which is synchronous with the flyback pulse; a switching unit for performing a switching operation in accordance with the output signal of the pulse width modulator; and an auxiliary transformer having a primary side coil to which an output signal of the switching unit is supplied and a secondary side coil which is connected in parallel to another secondary side coil of the flyback transformer, for producing an output pulse corresponding to the flyback pulse outputted from the flyback transformer.

2 Claims, 6 Drawing Sheets

HIGH VOLTAGE STABILIZING CIRCUIT

CLAIM OF PRIORITY

This application makes reference to, incorporates the same herein, and claims all benefits accruing under 35U.S.C. §119from an application for *HIGH VOLTAGE STABILIZING CIRCUIT* earlier filed in the Korean Industrial Property Office on 28 Mar., 1996and there duly assigned Ser. No. 8907/1996.

BACKGROUND OF THE INVENTION

1. Field of the Invention

The present invention relates to a high voltage stabilizing circuit for use in a display device, and more particularly, to a high voltage stabilizing circuit which is capable of additionally including an auxiliary transformer that produces an output pulse corresponding to an output pulse from a flyback transformer which serves to transmit a high voltage to an anode of an cathode ray tube, thereby generating a stabilized high voltage.

2. Discussion of Related Art

Generally, a display device, as a representative one of a computer's peripheral devices, serves to form an image of signal transmitted from the computer, so that a user can recognize the image formed thereon.

In an earlier display device, a microcomputer receives horizontal and vertical synchronizing signals from a video card to thereby generate a screen control signal for controlling the screen of a monitor. Vertical and horizontal deflection circuits respectively receive the vertical and horizontal synchronizing signals and respectively perform vertical and horizontal deflection such that an electron being generated by an electron gun of a cathode ray tube is deflected in a regular sequence from a left upper portion to a right lower portion of the cathode ray tube by means of deflection yoke to thereby form an image. By using a principle of a switching circuit and high voltage technology, a high voltage circuit uses a flyback pulse generated from an output terminal of the horizontal deflection circuit to provide a high voltage to an anode of the cathode ray tube.

In the above-noted display device, the image is formed from the electron beam projected onto a fluorescent surface thereof.

A high voltage circuit serves to supply a stable DC voltage to the anode of the cathode ray tube.

The display device should have its high voltage stabilized against variations of the electron beam current. To this end, the high voltage circuit includes a high voltage stabilizing circuit for stabilizing the high voltage and if the high voltage is over a predetermined level, an X-ray protection circuit is provided for sensing the over voltage and thus stopping the horizontal oscillation.

In one variety of an earlier high voltage stabilizing circuit, a portion of the high voltage is input to an error amplifier whose other input is connected to a reference voltage. The error voltage generated by the error amplifier is fed back to a power control circuit to control the current flowing through a flyback transformer and the horizontal output transistor.

The power control circuit may either be a switching converter being controlled by a pulse width modulator or merely a power switching transistor.

In another type of earlier high voltage stabilizing circuit, the output of the error amplifier is fed to a pulse width modulator which in turn controls a field effect transistor connected to one side of an auxiliary transformer whose other side is connected in series with the flyback transformer.

However, the auxiliary transformer must be large since all of the current at the primary side coil of the flyback transformer also flows through the auxiliary transformer.

The following U.S. patents each disclose high voltage power supply circuits in which a portion of the high voltage is fed back to a third winding on the flyback transformer for control purposes. However, none of these patents teaches or suggests the use of an auxiliary transformer having a secondary coil connected in parallel to the third coil of the flyback transformer as in the present invention.

U.S. Pat. No. 4,534,411 to Willis, entitled *Regulated Power Supply Circuit*, U.S. Pat. No. 4,728,868 to Ishikawa et al., entitled *High Voltage Generating Circuit*, U.S. Pat. No. 4,823,248 to Ikeuchi et al., entitled *High Voltage Generator*, and U.S. Pat. No. Iwai et al., entitled *High Voltage Regulating Circuit*.

The following U.S. patents each disclose features in common with the present invention but are not as pertinent as those references noted above:

U.S. Pat. No. 4,559,591 to Grünsch, entitled *D.C. Voltage Converter Including A Pulse With Controlled Semiconductor Switch*, U.S. Pat. No. 4866,353 to Haferl, entitled *Arrangement For Reducing Ringing In A Flyback Transformer*, U.S. Pat. No. 4,916,366 to Wilber et al., entitled *Power Supply Protection Circuit*, U.S. Pat. No. 4,968,106 to Ikeuchi et al., entitled *High Voltage Generating Apparatus For Television Equipment*, U.S. Pat. No. 5,089,947 to Driscoll et al, entitled *Power Supply Circuit Featuring Minimum Parts Count*, U.S. Pat. No. 5,266,871 to Haferl, entitled *High Voltage Stabilization Circuit For Video Display Apparatus*, U.S. Pat. No. 4,466,051 to Fitzgerald, entitled *Regulated Power Supply Incorporating A Power Transformer Having A Tightly Coupled Supplemental Power Transfer Winding*, and U.S. Pat. No. 4,509,731 to Miko et al., entitled *Magnetic Switching Regulator For A Deflection Circuit*.

BACKGROUND OF THE INVENTION

Accordingly, the present invention is directed to a high voltage stabilizing circuit that substantially obviates one or more of the problems due to limitations and disadvantages of the related art.

An object ofthe invention is to provide a high voltage stabilizing circuit which is capable of additionally adding an auxiliary transformer that produces an output pulse considerably corresponding to an output pulse from a flyback transformer, to a third coil winding of the flyback transformer, thereby producing a stabilized high voltage.

To achieve this and other objects, a high voltage stabilizing circuit according to the present in invention includes an error amplifier for receiving a flyback pulse rectified from one secondary side coil of a flyback transformer at an inverting terminal thereof and for receiving a reference voltage at a non-inverting terminal thereof, to thereby compare the received inputs; a pulse width modulator for implementing a modulating operation by an output signal of the error amplifier and for simultaneously generating an output signal which is synchronous with the flyback pulse; a switching unit for performing a switching operation in accordance with the output signal of the pulse width modulator; and an auxiliary transformer having a primary side coil to which an output signal of the switching unit is supplied and a secondary side coil which is connected in parallel to another secondary side coil of the flyback transformer, for producing an output pulse corresponding to the flyback pulse outputted from the flyback transformer.

It is to be understood that both the foregoing general description and the following detailed description are exemplary and explanatory and are intended to provide further explanation of the invention as claimed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

Figure 2:
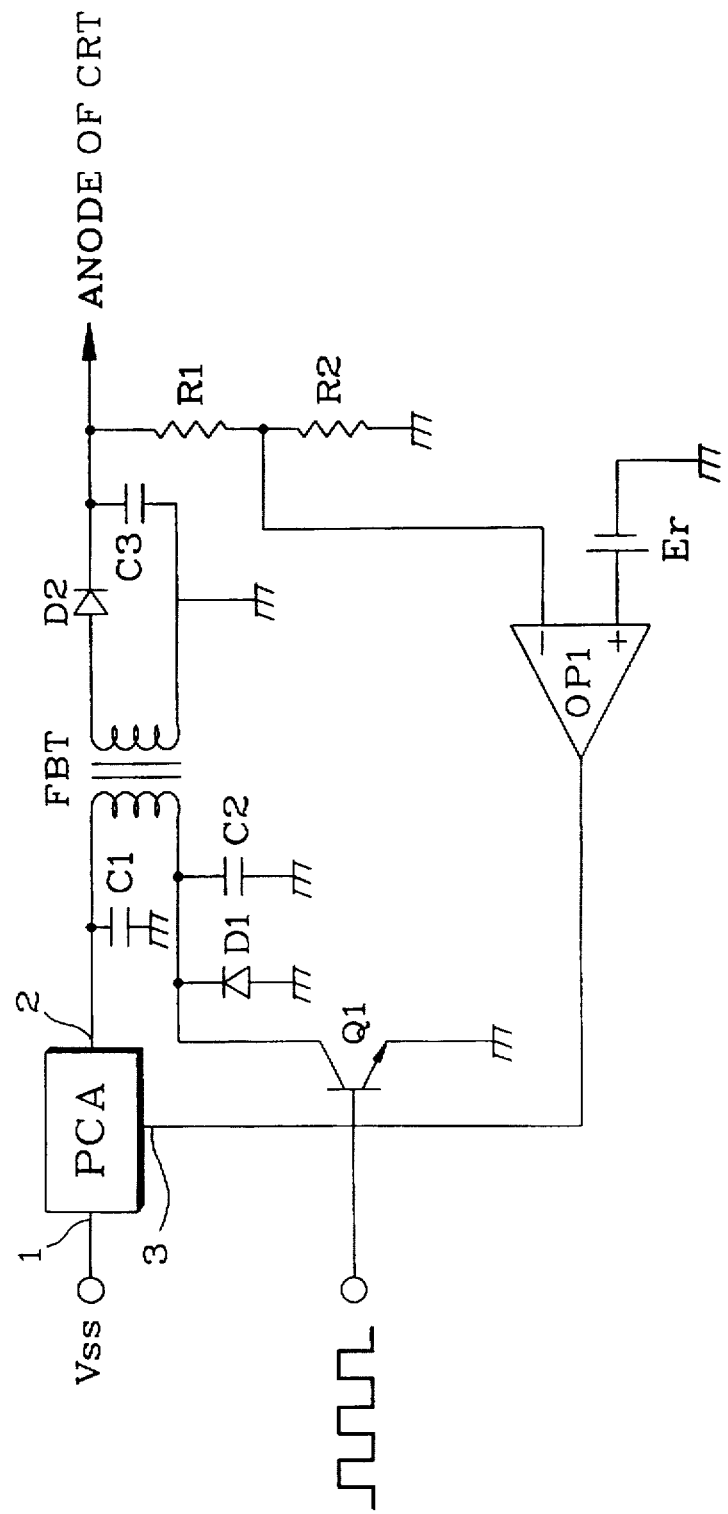
FIG. 2 is a circuit diagram illustrating an earlier high voltage stabilizing circuit.
Figure 4:
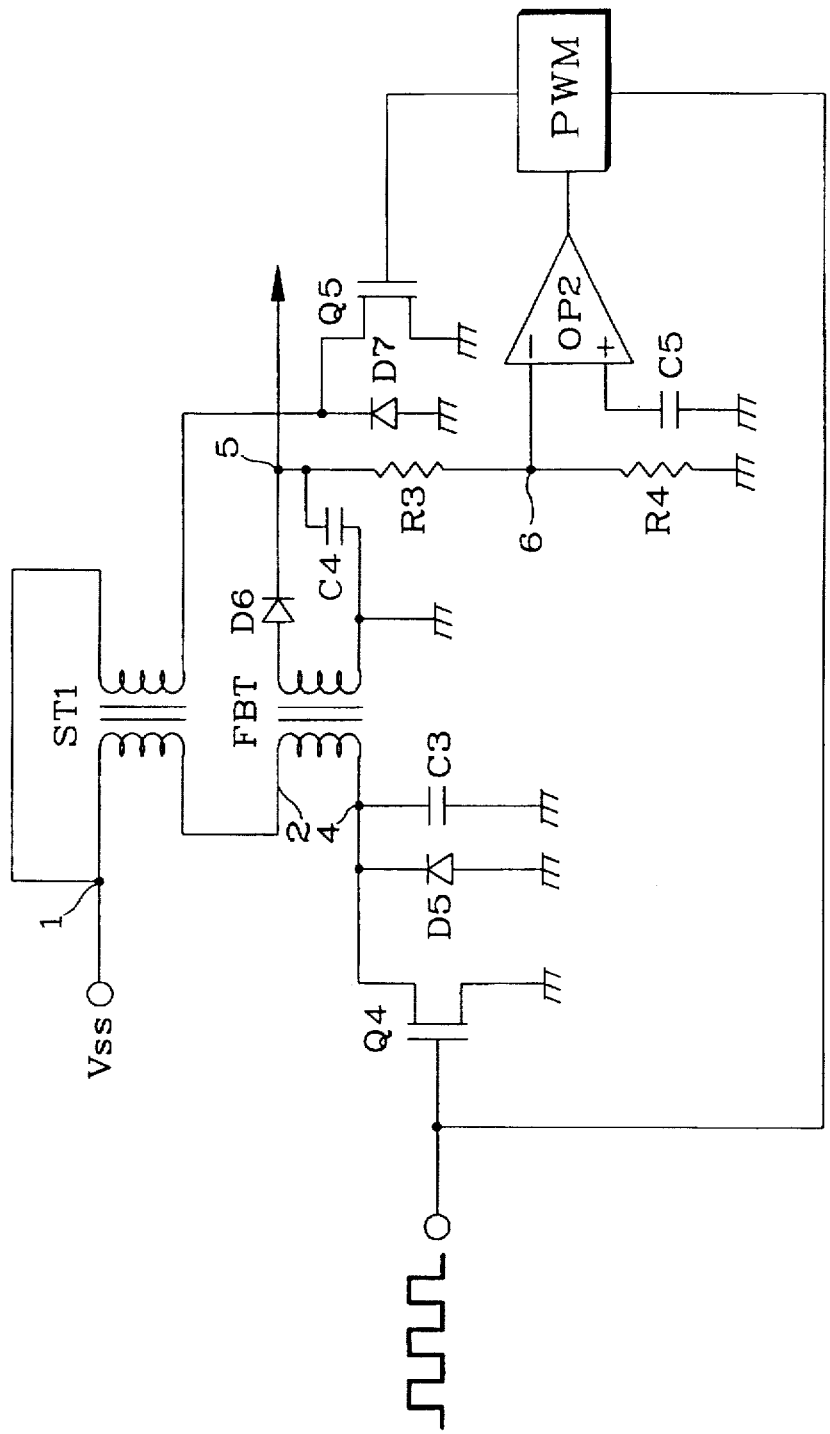
Figure 5:
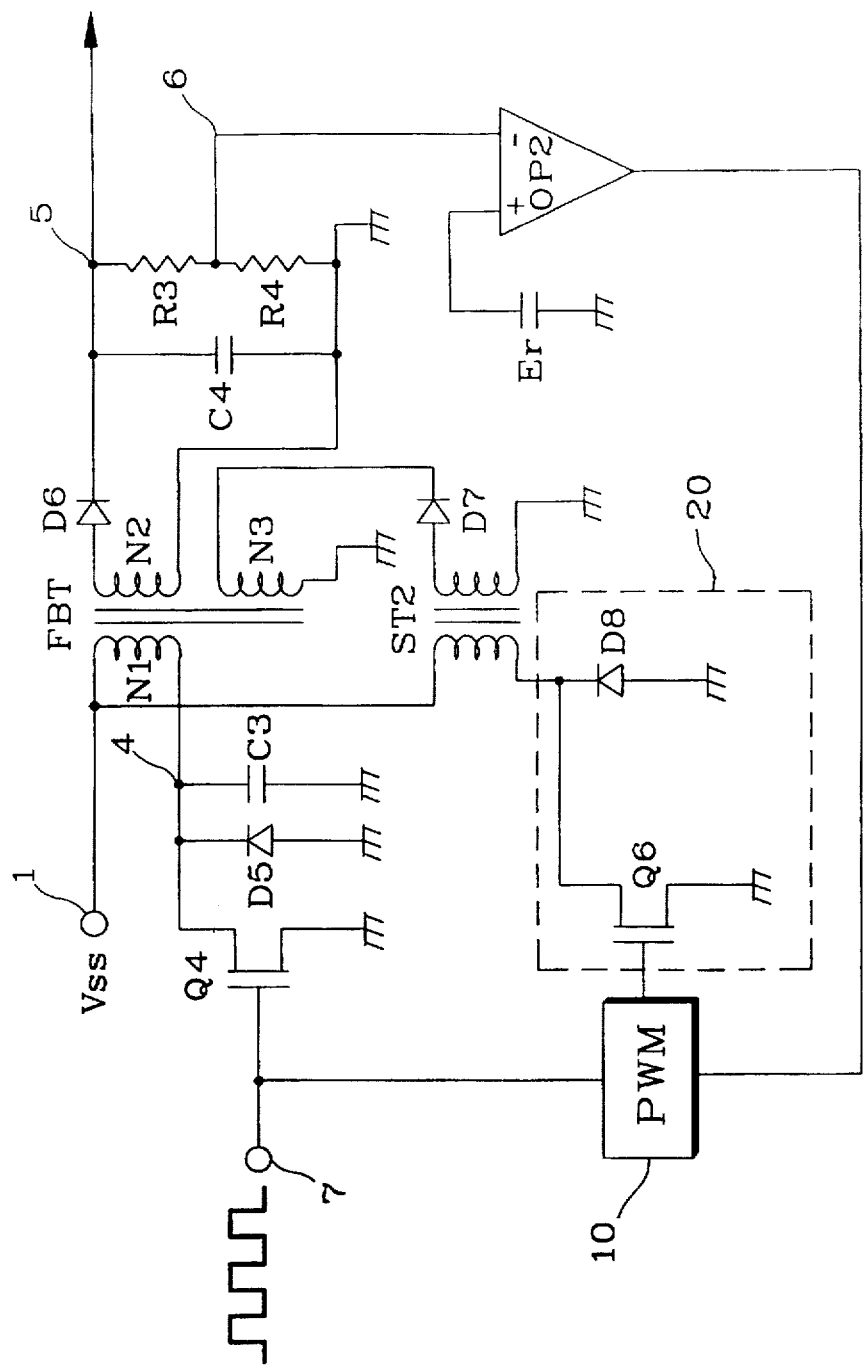
Figure 6A:
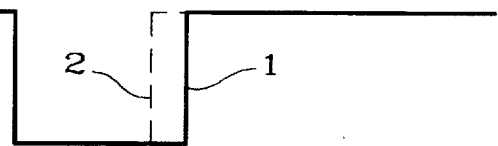
Figure 6B:
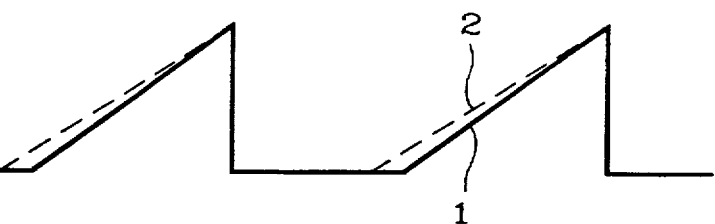
Figure 6C:
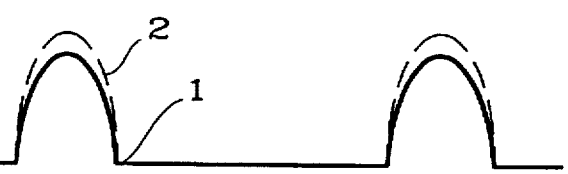

1o FIGS. 3R and 3l fare circuit diagrams illustrating types of the power control circuit of FIG. 2;

FIG. 4 is a circuit diagram illustrating another earlier high voltage stabilizing circuit;

FIG. 5 is a circuit diagram illustrating a high voltage stabilizing circuit according to the present invention; and FIGS. 6A to 6C are waveform diagrams illustrating signals generated in FIG. 5.

DETAILED DESCRIPTION OF PREFERRED EMBODIMENT

Figure 1:
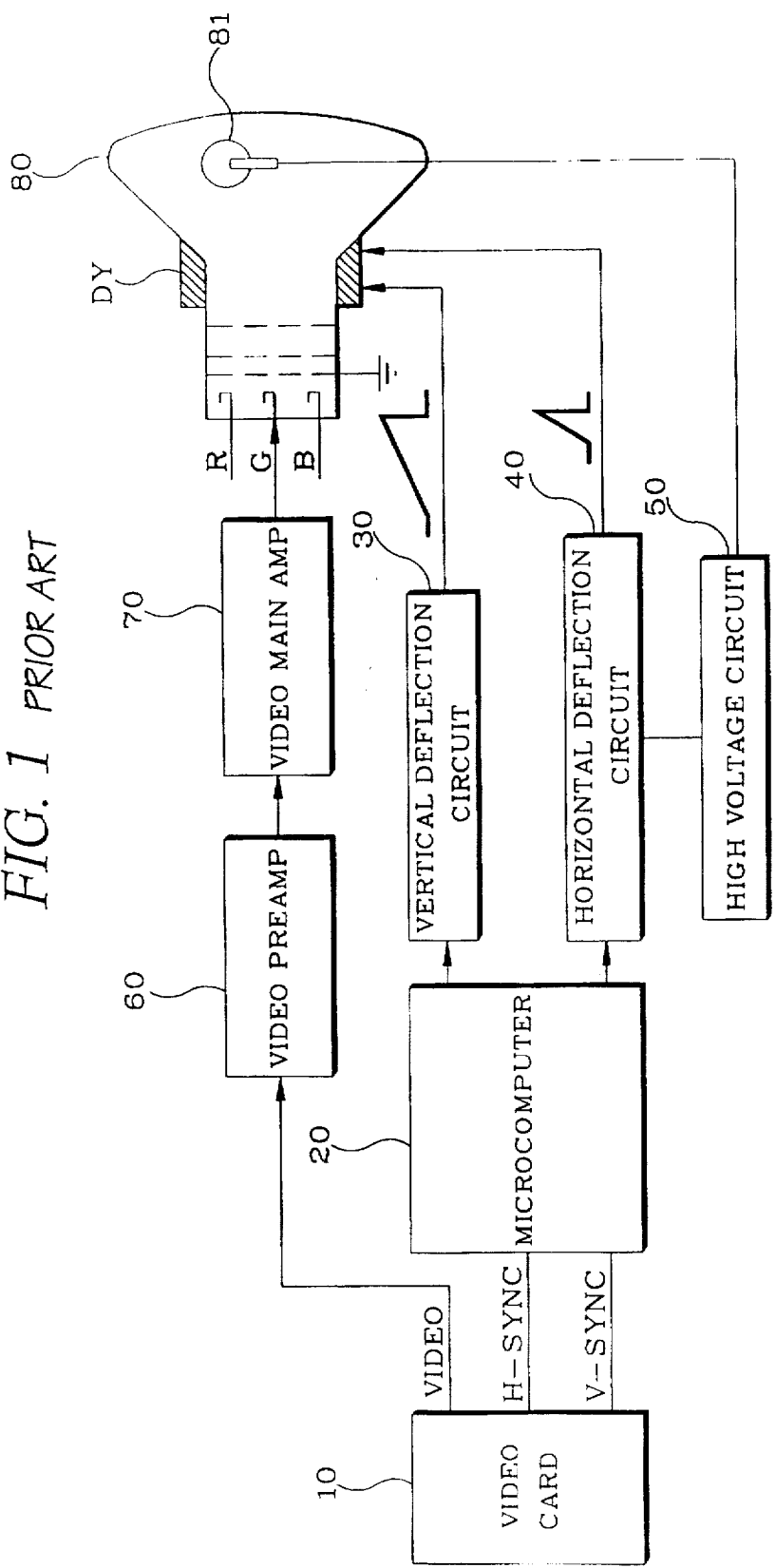
FIG. 1 is a schematic block diagram illustrating a construction of an earlier display device.

FIG. 1 is a schematic block diagram illustrating a construction of an earlier display device. As shown in FIG. 1, a video card 10 is installed within a computer (not shown) and supplies video signals R, G and B and horizontal/vertical synchronizing signals H-SYNC and V-SYNC required for image formation. A microcomputer 20 receives the horizontal/vertical synchronous signals H-SYNC and V-SYNC from the video card 10 to thereby generate a screen control signal for controlling the screen of a monitor. Vertical and horizontal deflection circuits 30 and 40 respectively receive the vertical/horizontal synchronizing signals V-SYNC and H-SYNC and respectively perform vertical and horizontal deflection, such that an electron beam generated by an electron gun of a cathode ray tube (hereinafter, simply referred to as a CRT) 80 is deflected in a regular sequence from a left upper portion to a right lower portion of the CRT 80 by means of a deflection yoke DY to thereby form an image. By using a principle of a switching circuit and high voltage technology, a high voltage circuit 50 utilizes a flyback pulse generated from an output terminal of the horizontal deflection circuit 40 to thereby provide a high voltage to an anode 81 of the CRT 80. A video preamplifier 60 serves to amplify the video signals R, G and B transmitted from the video card 10, to thereby hold a predetermined voltage level, and a video main amplifier 70 serves to amplify the amplified signals by the video preamplifier 60 as the video signal R, G and B at 40 Vpp to 60 Vpp, to thereby provide energy to each picture.

In the above-noted display device, the image is formed from the electron beam projected onto a fluorescent surface thereof. In this case, a deflection circuit functions to change the deflection of the electron beam. Generally, the deflection circuit performs an electrostatic deflection using an electric field or an electromagnetic deflection using a magnetic field. For example, a television forms a screen by causing a toothed waveform an of electrical current to flow into horizontal and vertical coils using the electromagnetic deflection.

In the meanwhile, the high voltage circuit 50 serves to supply a stable direct current DC voltage to the anode 81 of the CRT 80. The types of construction of the high voltage circuit 50 are classified into an integrated type with the horizontal deflection circuit and a separated type therefrom. Currently, the separated type has been widely used because of a good quality of high voltage regulation, although it has a high production cost and a complicated circuit construction.

As generally noted, the display device for specifically requiring a stabilized accelerated voltage of the CRT 80 should have an absolutely stabilized high voltage against variation of the electron beam current. To this end, the high voltage circuit 50 includes a high voltage stabilizing circuit for stabilizing the high voltage, and if the high voltage is over a predetermined level, an X-ray protection circuit is provided for sensing the over-voltage and thus stopping horizontal oscillation.

There are two representative methods of constituting the high voltage circuit 50. One method supplies a voltage in a flyback transformer (hereinafter, referred to as an FBT), which causes a response speed of the rectifying circuit to be slow. The other method negative-feedback controls a resonant frequency of the FBT by a high voltage or a peak value of flyback pulse generated from the winding wires of FBT, which obtains only a narrow control range.

FIG. 2 is a circuit diagram illustrating an earlier high voltage stabilizing circuit. An output terminal of a power control circuit PCA and a collector of a transistor Q1 are respectively connected to a primary side coil of the FBT, and an anode of the CRT and an inverting terminal of an error amplifier OP1 are respectively connected to a secondary side coil of the FBT.

An output capacitor C1 is coupled between the PCA and the primary side coil of the FBT, and a resonant capacitor C2 and a damping diode D1 are respectively connected in parallel between the other terminal of the primary side coil of the FBT and the collector of the transistor Q1.

Further, a diode D2, a high voltage smoothing capacitor C3, and voltage-dividing resistors R1 and R2 are coupled to the secondary side coil of the FBT.

The voltage supplied to the inverting terminal of the error amplifier OP1 is rectified by the diode D2 which is connected to the secondary side coil of the FBT, and then divided by the voltage-dividing resistors R1 and R2.

In the figure, a reference symbol 'E$_r$' represents a reference voltage, and a square wave (driving pulse) having approximately a 50% duty cycle is transmitted from a horizontal drive circuit and is supplied to the base of the transistor Q1.

A principle equation for the high voltage stabilizing circuit as constructed above is given as follows:

$$V_h = E_{bb} \left( \frac{\pi}{2} \cdot \frac{T}{T_r} + 1 \right) \frac{N_h}{N_p} \quad (1)$$

wherein, the reference symbol "$V_h$" indicates a high voltage value, the "$T_r$" a flyback time period, the "$E_{bb}$" a power supply voltage, the "T" is period time, the "$N_h$" the number of high voltage winding wires, and the "$N_p$" the number of primary winding wires. The "$E_{bb}$", "T" and "$T_r$" among these parameters can be electrically controlled, but since the "T" is a real fixed value, the "$E_{bb}$" and "$T_r$" are substantially controlled.

Figures 3A, 3B:
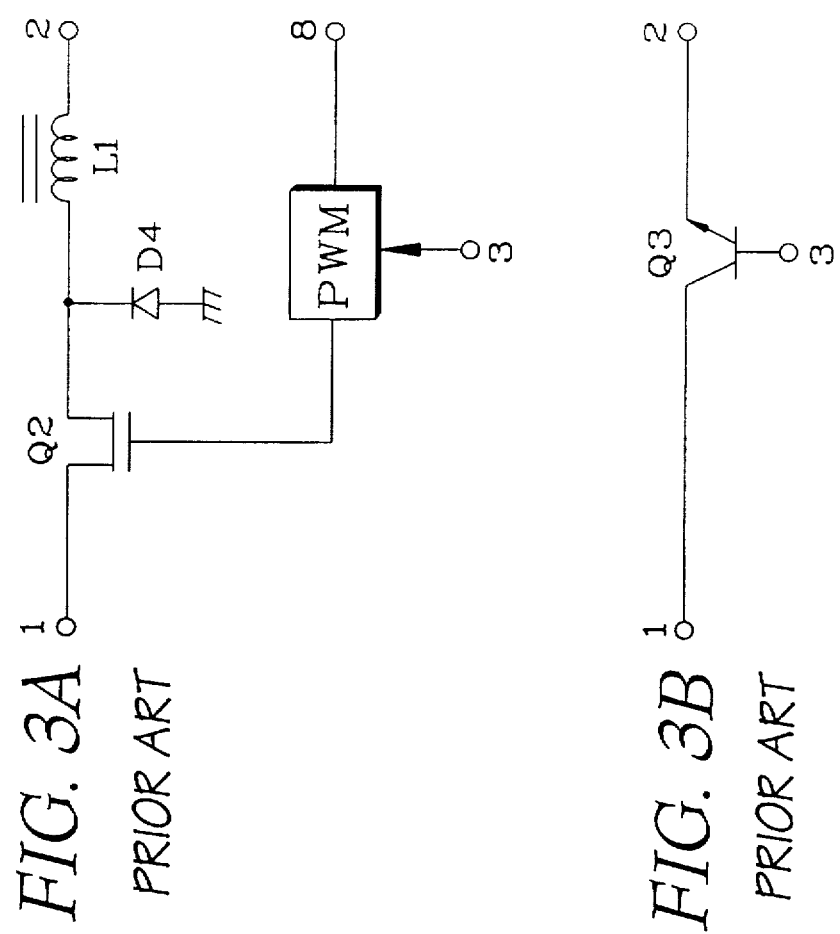

FIGS. 3A and 3B are circuit diagrams illustrating two types of power control circuit of FIG. 2. In FIG. 3A, there is provided a switching converter type having a field effect transistor Q2, a diode D4 and a pulse width modulator PWM integrated circuit. In FIG. 3B, there is provided a series regulator type having a switching transistor Q3 has its collector to which a potential $V_{ss}$ is applied, its base to which a signal fed back from the FBT is applied, and its emitter to which the primary side coil of the FBT is connected.

The transistor Q2 is a power switching transistor, the reference symbol L1 indicates a choke coil, and the diode D4 is a power clamp diode. A trigger pulse having a switching frequency is supplied to the terminal 8 of the PWM.

A boosted flyback pulse generated in the secondary side coil of FBT is rectified through the diode D2, and the error amplifier OP1 compares the voltage divided by the resistors R1 and R2 with the reference voltage $E_r$, to thereby obtain an error voltage, which drives the power control circuit of FIG. 2 for performing a negative feedback control.

In this case, there occur various problems in that a real response speed is slow due to the existence of the output capacitor C1, and a high voltage level is changed and deflection of image is generated, since load is decreased in a vertical blanking period and a load state is fluctuated in accordance with an image signal.

FIG. 4 is a circuit diagram illustrating another high voltage stabilizing circuit, which is free from the above problems.

In construction, positive or negative pulses additionally generated during a flyback interval are controlled by an auxiliary transformer ST1 being connected in series with the resonant circuit at the primary side coil of the FBT, when compared with the circuit construction of FIG. 2.

The high voltage divided by resistors R3 and R4 and the reference voltage $E_r$ are compared by an error amplifier OP2, which produces the compared result as an error voltage.

At the time, the response speed is relatively rapid since the output capacitor C1 of FIG. 2 is not needed. However, the auxiliary transformer ST1 is large, the flyback pulse is generated at the secondary side coil, and a control output transformer capable of outputting a high voltage is required, since all the current at the primary side coil of the FBT flows through the auxiliary transformer ST1.

Reference will now be made in detail to the preferred embodiments of the present invention, examples of which are illustrated in the accompanying drawings.

FIG. 5 is a circuit diagram illustrating a high voltage stabilizing circuit constructed according to the present invention.

In construction, voltage-dividing resistors R3 and R4 are connected to a secondary side coil N2 of the FBT. Then, an error amplifier OP2 is connected to a contact point between the resistors R3 and R4, for receiving the divided voltage by the resistors R3 and R4 at an inverting terminal thereof and for receiving a reference voltage $E_r$ at a non-inverting terminal thereof A pulse width modulator 10 is connected to the output terminal of the error amplifier OP2, thereby being modulated by the output signal of the error amplifier OP2 and generating an output signal which is synchronous with the flyback pulse.

A switching unit 20 is connected to the output terminal of the pulse width modulator 10, for performing a switching operation in accordance with the output signal of the pulse width modulator 10.

Furthermore, an auxiliary transformer ST2 has a primary side coil to which an output signal of the switching unit 20 is supplied and a secondary side coil which is connected in parallel to a third secondary coil N3 of the FBT, for producing an output pulse corresponding to the flyback pulse outputted from the FBT.

In more detail, a clamp diode D8 is coupled to a drain of a switching transistor Q6, within the switching unit 20. A coupling diode D7 is connected between the third coil winding N3 of the FBT and the auxiliary transformer ST2. Meanwhile, it can be appreciated that the rest of the component devices are denoted by the same reference numerals as those of FIG. 4.

The pulse width modulator 10 is modulated by the output signal of the error amplifier OP2, but generates an output signal that is synchronous to the time when the switching transistor Q6 is in the non-conductive state and has a variable leading edge.

The switching transistor Q6 is turned on/off in accordance with the output signal of the pulse it width modulator 10. At the time, the energy "$P_{ST}$" given by the following equation is accumulated in the auxiliary transformer ST2.

$$P_{ST} = \frac{(V_{CC} \cdot T_C)^2}{2 \cdot L_{PP}} \quad (2)$$

wherein, the parameters "$P_{ST}$" indicates an accumulated energy within the auxiliary transformer ST2, the "$L_{pp}$" represents a primary side coil inductance of the auxiliary transformer ST2, the "$T_c$" is indicative of a conduction period of the transistor Q6, and the "$V_{cc}$" indicates a power supply voltage.

The accumulated energy within the auxiliary transformer ST2 is released at the instant where the switching transistor Q6 is turned off and thus generates a high level of pulse voltage to the secondary winding wire of the auxiliary transformer ST2.

Since the dynamic pulse generated at the auxiliary transformer ST2 is synchronous with the generation time of the flyback pulse of FBT, the coupling diode D7 is turned on at the time when the dynamic pulse voltage exceeds the flyback pulse voltage.

Therefore, the flyback pulse voltage is changed and its high voltage output value is controlled, in accordance with the accumulated energy within the auxiliary transformer ST2.

FIGS. 6A to 6C are waveform diagrams illustrating signals generated in FIG. 5, in which FIG. 6A is a waveform of a voltage supplied to the drain of the switching transistor Q6. FIG. 6B is a waveform of current flowing to the drain of the switching transistor Q6, and FIG. 6C is a waveform of a pulse voltage generated at the secondary side coil of the FBT.

In the figures, the reference numeral "1" indicates the case where no auxiliary transformer ST2 exists, and the reference numeral "2" indicates the case where the auxiliary transformer ST2 is disposed to generate the accumulated energy. The pulse width modulator synchronous signal is regardless of any signal which is synchronous to a horizontal synchronous signal.

As set forth in the above, a high voltage stabilizing circuit according to the present invention additionally includes an auxiliary transformer which is connected in parallel to another secondary side coil of the FBT, and controls a high voltage output using an accumulated energy within the auxiliary transformer, to thereby cause a more stabilized high voltage.

It will be apparent to those skilled in the art that various modifications and variations can be made in a high voltage stabilizing circuit of the present invention without departing from the spirit or scope of the invention. Thus, it is intended that the present invention cover the modifications and variations of this invention provided they come within the scope of the appended claims and their equivalents.

What is claimed is:

1. A high voltage stabilizing circuit, comprising:

a flyback transformer;

an error amplifier for receiving a flyback pulse rectified from one secondary side coil of said flyback transformer at an inverting terminal thereof and for receiving a reference voltage at a non-inverting terminal thereof, and for comparing the received inputs;

a pulse width modulator for implementing a modulating operation in response to an output signal from said error amplifier and for simultaneously generating an output signal which is synchronous with the flyback pulse;

a switching unit for performing a switching operation in accordance with the output signal of said pulse width modulator; and an auxiliary transformer having a primary side coil to which an output signal of said switching unit is supplied and having a secondary side coil which is connected in parallel to another secondary side coil of said flyback transformer, for producing an output pulse corresponding to the flyback pulse outputted from said flyback transformer.

2. A high voltage stabilizing circuit, comprising:

a flyback transformer having a primary side coil and first and second secondary side coils, said first secondary side coil being connected to a rectifier and filtering circuit for generating a rectified flyback pulse therefrom;

an error amplifier comprising an operational amplifier for receiving said receiving said rectified flyback pulse from said first secondary side coil of said flyback transformer at an inverting terminal thereof and for receiving a reference voltage from a reference voltage source at a non-inverting terminal thereof and for comparing the received inputs;

a pulse width modulator for implementing a modulating operation in response to an output signal from said error amplifier and for simultaneously generating an output signal which is synchronous with the flyback pulse;

a switching unit comprising a field effect transistor for performing a switching operation in accordance with the output signal of said pulse width modulator; and an auxiliary transformer having a primary side coil connected to an output of said switching unit and having a second side coil which is connected in parallel to said second secondary side coil of said flyback transformer for producing an output pulse corresponding to the flyback pulse outputted from said flyback transformer.

* * * * *